March 2, 1965  A. JOHNSON  3,171,512
LOCKING MEANS FOR A RADIAL ARM DRILLING MACHINE
Filed Dec. 15, 1960  4 Sheets-Sheet 1
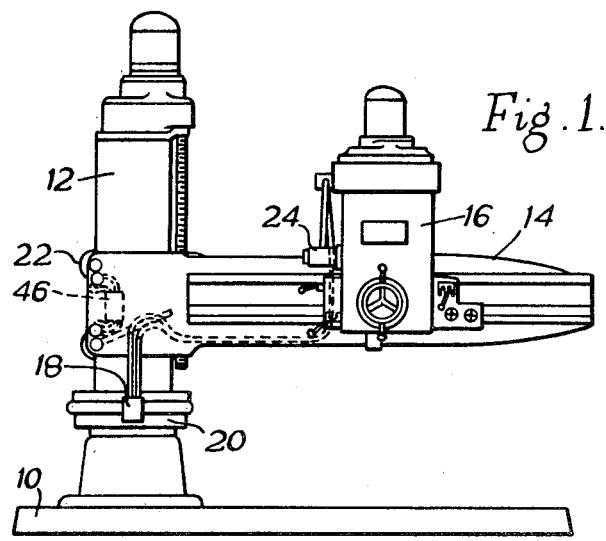
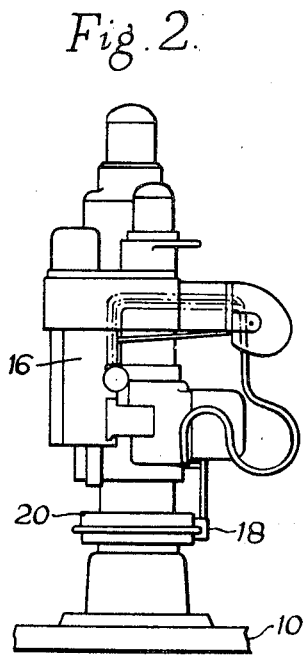
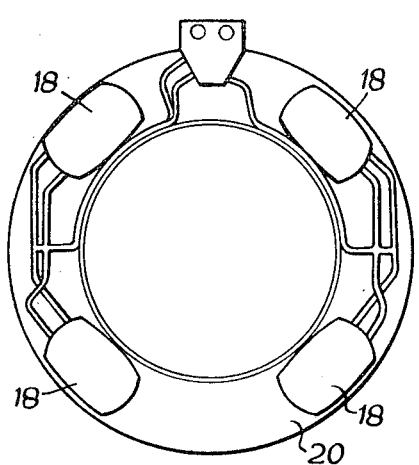
INVENTOR
Alfred Johnson
BY
ATTORNEY March 2, 1965   A. JOHNSON   3,171,512
LOCKING MEANS FOR A RADIAL ARM DRILLING MACHINE
Filed Dec. 15, 1960   4 Sheets-Sheet 2

INVENTOR
Alfred Johnson
BY
ATTORNEY

March 2, 1965  A. JOHNSON  3,171,512
LOCKING MEANS FOR A RADIAL ARM DRILLING MACHINE
Filed Dec. 15, 1960  4 Sheets-Sheet 4

United States Patent Office 3,171,512
Patented Mar. 2, 1965

3,171,512
LOCKING MEANS FOR A RADIAL ARM
DRILLING MACHINE
Alfred Johnson, Halifax, England, assignor to
William Asquith Limited
Filed Dec. 15, 1960, Ser. No. 75,962
Claims priority, application Great Britain, Dec. 16, 1959,
42,720/59
9 Claims. (Cl. 188—71)

Drilling machines of the radial arm type are provided with locking means which enable the radially movable arm and sleeve to be locked in any desired radial position about its supporting pillar and for retaining the arm in any desired vertical position on the pillar. In addition, locking means are provided to enable the slide carried by the arm to be locked in a desired position on the arm.

The locking means are mechanical, and usually comprise one or more bolts which are adapted to be operated by link and cam mechanisms so as to cause one member to grip the member on which it is supported and thus be locked in position.

It is a disadvantage of the mechanical locking means that mechanical motion is lost in the link and cam mechanisms during its operation and this can result in unequal forces being applied to the bolts which comprise the locking means, if more than one bolt is used, thus causing inaccuracies to occur in the positioning of the various parts of the drill.

It is the object of this invention to provide locking means in which the above-mentioned disadvantages are reduced or eliminated.

According to this invention the locking means for a radial arm drilling machine are adapted to be hydraulically operated. The locking means preferably comprise one or more rotatable members, each of which is adapted to be rotated by means of liquid under pressure, rotation of the member in one direction causing a locking member operatively connected to the rotatable member to move to the locking position, while rotation of the rotatable member in the opposite direction causes the locking member to move to the unlocking position. Locking means are provided for retaining the radial arm in any desired vertical and angular position on the supporting pillar and sleeve and for retaining the slide in any desired position on the arm and means are preferably provided to permit simultaneous operation of any combination of the locking means.

Means may also be provided to prevent operation of the mechanism for causing movement of the arm and the slide while the locking means for the arm or slide are in the locking position.

One construction of a drilling machine of the radial arm type which is provided with locking means in accordance with the invention will now be described by way of example only with reference to the accompanying drawings in which:

FIGURE 1 is a front elevation of the drilling machine,

FIGURE 2 is a view from the end of the drill,

Figure 4:
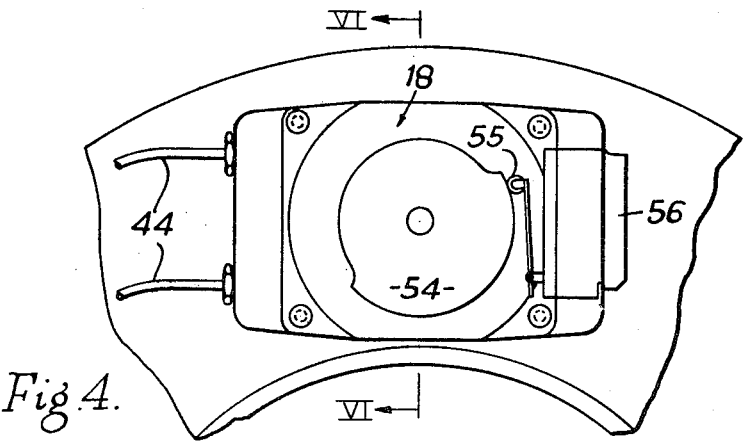
Figure 5:
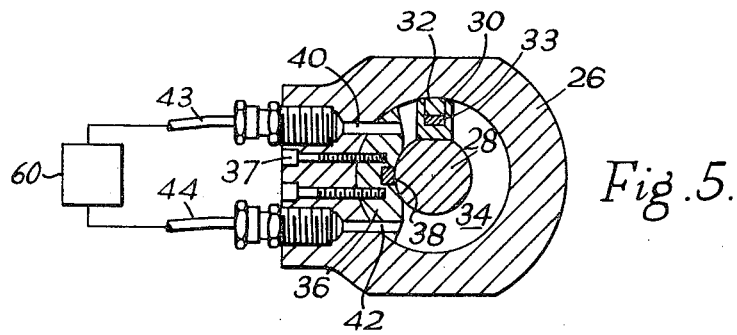
Figure 6:
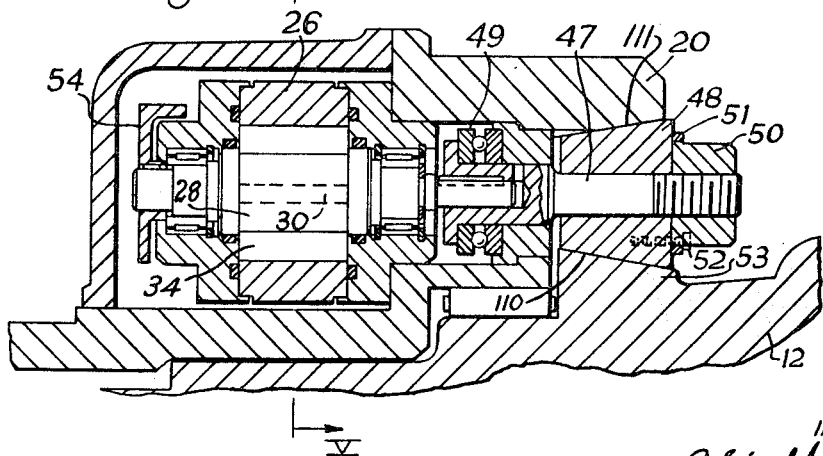
Figure 7:
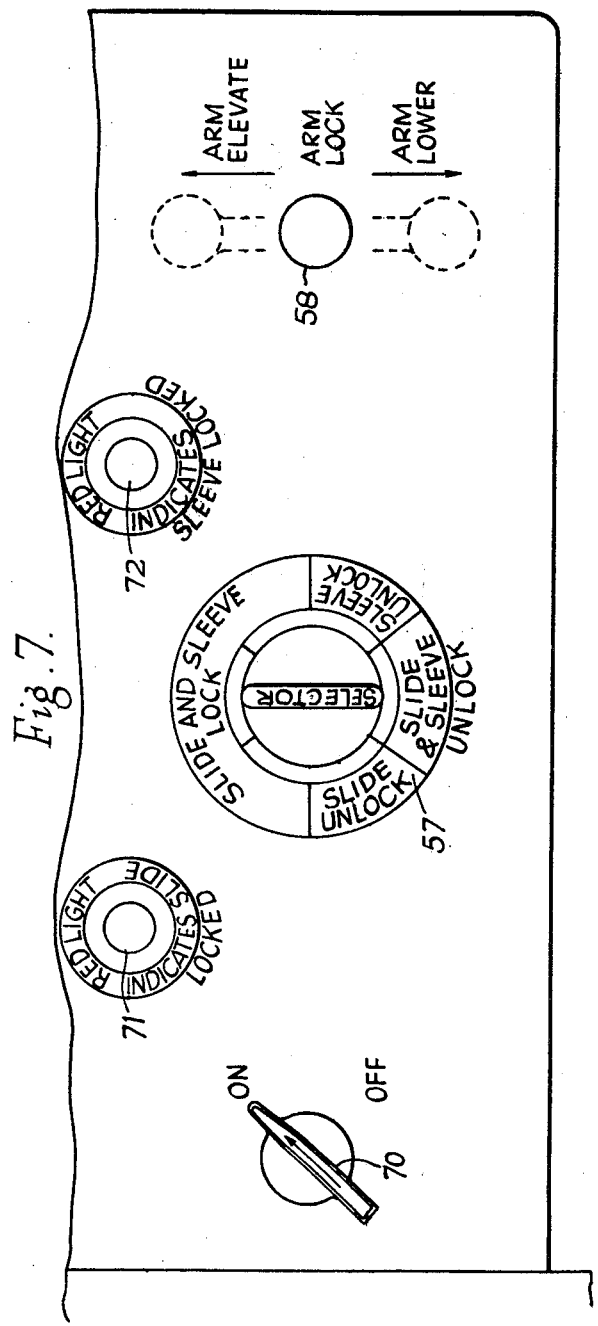
Figure 8:
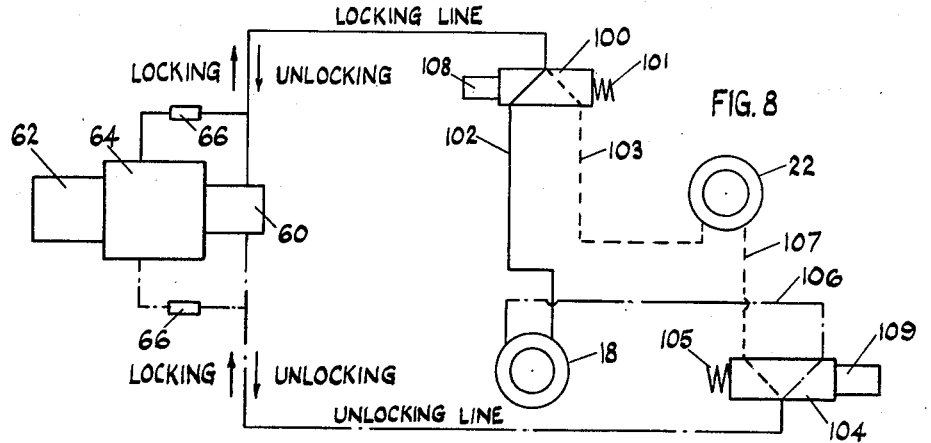
Figure 9:
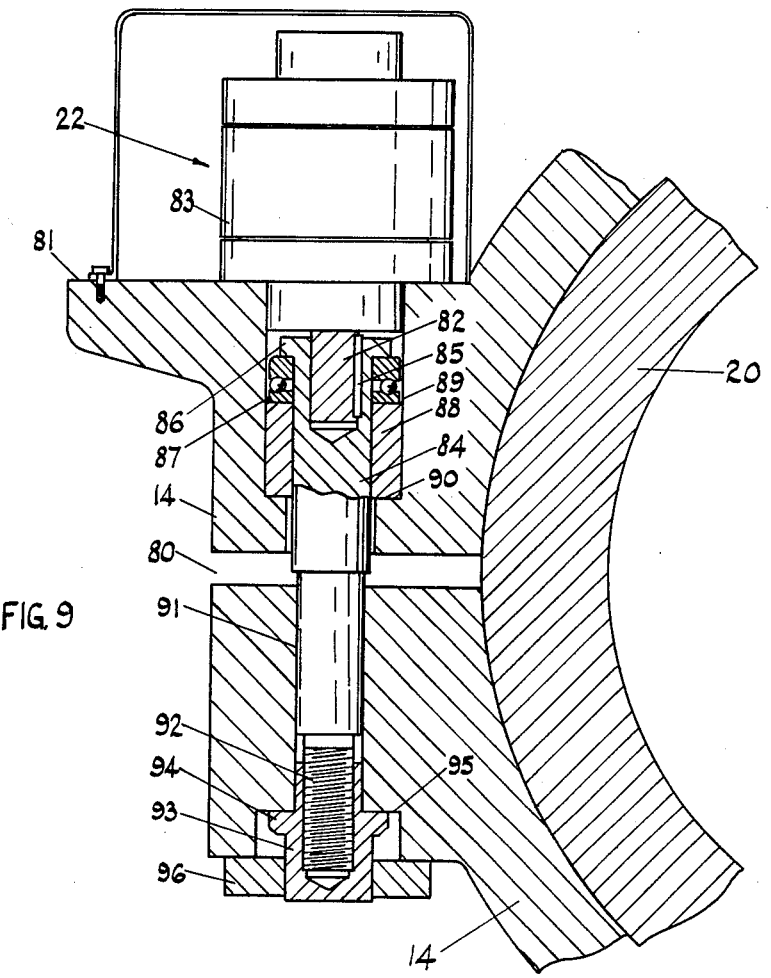

FIGURE 3 shows an arrangement of locking units as applied to the arm and sleeve and pillar, FIGURE 4 is a plan view of one of the locking units fitted with a micro-switch arrangement and with the cover removed, FIGURE 5 is a sectional view on the line V—V, FIGURE 6, FIGURE 6 is a sectional side elevation of FIGURE 4 on the line VI—VI, FIGURE 7 shows an arrangement of a central panel, FIGURE 8 is a diagrammatic layout of the hydraulic system, and FIGURE 9 is a horizontal cross-section through a locking device for locking the arm to the pillar.

Referring to the drawings, the drilling machine has a base plate 10, at one end of which is mounted a pillar 12. A laterally projecting arm 14 is rotatably mounted on the pillar and a slide 16 is mounted on the arm. The drill is provided with four hydraulically operated locking members 18 on its pillar sleeve 20, the said locking members 18 being adapted to lock the sleeve 20 to the pillar. Also provided are locking members 22 which are adapted to prevent vertical movement of the arm relatively to the sleeve, and locking members 24 which are adapted to prevent movement of the arm slide 16 along the arm.

One of the locking members is illustrated in FIGURES 4 to 6, and comprises a hydraulic cylinder 26 in which a spindle 28 is rotatably mounted, the spindle 28 having a radial projection or vane 30 which works in an annular chamber 34 in the cylinder. A metal pad 32 is disposed in a groove in the outer end of the vane 30 and is resiliently urged outwardly into sealing engagement with the cylindrical wall of the chamber. A manifold block 36 is mounted in the chamber 34 by means of screws 37 and extends through an arc of approximately 90°. A resilient sealing strip 38 is mounted in a slot in the manifold block 36, the said resilient sealing strip bearing against the spindle 28. The manifold block 36 therefore serves as an abutment to limit the rotational movement of the vane 30 and it has ports 40 and 42 at opposite sides of the sealing strip 38 for the supply and exhaust of operating liquid. A pipe 43 is connected to the port 40, and a pipe 44 is connected to the port 42, the two pipes 43 and 44 leading to opposite sides of a pump 46 which may be mounted in any convenient position on the machine, and in this particular arrangement, the pump 60 is mounted on the inner end of the arm 14, see FIGURE 1.

One end of the spindle 28 is keyed in a bore in a secondary spindle 47 which is rotatably mounted in a bearing 49 in the pillar sleeve 20, and extends through a bore in the wedge member 48, in the form of a ring having internal and external surfaces, the outer end of the secondary spindle 47 being screw-threaded and engaged with a nut which bears against the outer end face of the ring 48. The nut has external serrations engaged with the serrated bore of an annular plate 51 detachably mounted on the member 48 by means of screws 52, one of which is shown in FIGURE 6. In this way the nut 50 is prevented from rotating relatively to the ring 48, but it can be adjusted along the screwed end of the secondary spindle by removing the plate 51. The tapered bore 110 of the member is encircled by a tapered annular flange 53 around the pillar 12, and the outer tapered surface 111 of the member 48 is itself encircled by a tapered bore in the pillar sleeve 20, the arrangement being such that when the spindle is rotated, the wedge member 48 will be moved axially relatively to the pillar 12 so as to lock the pillar and pillar sleeve together with a wedging action. The member 48 comprises two or more arcuate sections for convenience in assembly. As the locking devices are equally spaced around the member 48 and as they are all connected by pipes 43 and 44 to the pump, they will be actuated in unison so that the ring will be urged bodily axially relatively to the pillar 12. Alternatively individual wedge members may be provided for each locking device.

It will be appreciated that each locking device will be operated by admitting liquid under pressure through one of the ports 40 and 42, the other port being connected to exhaust, and consequently the liquid under pressure will act on one side of the vane 30 so as to displace the vane and so rotate the spindle 28. The sealing strip 38 prevents leakage of the liquid between the ports 40 and 42, and the strip 32 acts as a seal between the outer end of the vane 30 and the cylindrical wall of the chamber 34. As previously stated, the strip 32 is resiliently mounted, and for this purpose it is preferred that the strip 32 should be backed by a rubber or like resilient block or strip 33 disposed in the groove in the vane. Instead of a rubber or like resilient backing, springs may be disposed between the bottom of the groove in the vane and the strip 32.

The locking devices 22 which are used to lock the arm 14 to the sleeve 20 are similar to the devices 18 described above. One such locking device is shown in detail in FIGURE 9.

The part of the arm 14 which surrounds the sleeve is slit vertically as indicated at 80 in FIGURE 9, and a locking device 22 is fixed to a facing 81 on one side of the slit, with the spindle 82 of the device projecting horizontally from the cylinder 83. A secondary spindle 84 is mounted in axial alignment with the spindle 82, and the spindle 82 enters a bore in one end of the secondary spindle, the two spindles being connected together by a key 85. A shoulder 86 is formed on the secondary spindle 84, and this shoulder abuts against one race of a thrust bearing 87, the other race of which abuts a thrust block 88 surrounding the spindle 84 and within a bore 89 in the arm 14, at one side of the slit 80.

On the other side of the slit, the secondary spindle 84 passes through a bore 91, and has a screwed end portion 92, which engages in a screwed nut 93, which has a shoulder 94 abutting a face 95 in the arm 14. A locking plate 96 is fixed to the arm, and engages with the nut 93, to prevent rotation of the nut.

When the device 22 is operated, its spindle 82 is rotated, and this causes the secondary spindle 84 to rotate. By virtue of the screw-and-nut connection, the nut 93 is drawn towards the thrust bearing, and the parts of the arm 14, on opposite sides of the slit 80 are drawn towards each other. Thus, the arm is nipped on to the sleeve, to lock the arm against vertical movement.

The locking of the arm slide is effected by means of a device 24 which is similar in construction to the device 18 described above, but the secondary spindle of the device 24 engages with a nut associated with a wedge member or a pad of any convenient type such as is usually provided for actuation by a manually operable lever.

An electrical trip may be associated with each locking member or group of locking members which lock any part of the machine traversed by power. The trip is so arranged as to prevent accidental traversing while the locks are on, and one such arrangement is illustrated in FIGURE 4. For this purpose a cam 54 is secured on the spindle 28 and is engaged by a cam follower 55 operatively connected to a micro switch 56 which operates in conjunction with a selector switch 57 and a manual arm elevating control lever 58.

The operating liquid for the hydraulic system is supplied by a gear pump 60 driven by an electric motor 62, and a reservoir 64 is provided for the liquid. Non-return valves 66 are also incorporated in the system.

The hydraulic system shown to the right of the pump 60 in FIGURE 8 is in effect a closed circuit system, and the reservoir is only required to make up losses through leakage or evaporation. A solenoid operated valve 100 is incorporated in the locking line, and this valve is loaded by a spring 101 into a "dead" position, as illustrated, where there is a path indicated by the full line 102 through the valve to the side of the sleeve locking device 18 which will cause operation of that device in a locking direction. In practice there are two or more devices 18 arranged in parallel, but only one is shown in FIGURE 8 to simplify the diagram. The path 103, which is closed when the valve 100 is in the "dead" position leads from the locking line to the operative side of the vane in the locking device 22.

A second solenoid operated valve 104 is provided in the unlocking line, and this valve is also loaded by a spring 105 into a "dead" position (as drawn). In this "dead" position, there is a path indicated by the chain-dotted line 106 from the unlocking line through the valve 104 to the reverse side of the vane in the sleeve locking device 18. A path 107, which is closed with the valve 104 in the "dead" position leads from the unlocking line to the reverse side of the arm locking device 22.

The lever 58 (see FIGURE 7) incorporates the usual switch for controlling the operaton of the electric motor which is used to raise and lower the arm 14 on the sleeve 20. It is also arranged to operate micro-switches (not shown) when it is moved to either the "arm elevate" or "arm lower" position, these switches being arranged to operate the solenoids 108 and 109 controlling the valves 100 and 104 respectively. When the lever 58 is in the central "arm lock" position, the solenoids 108 and 109 are not energized, so the valves 100 and 104 remain in their "dead" positions under their spring loading. In this position, the arm lock 22 will be on, and the arm 14 will be locked against vertical movement.

If it is required to lock the sleeve, the pump 60 is driven in the lock direction, so that liquid flows via the locking line and line 102 to the devices 18, which it operates into the locked position. Liquid on the reverse side of the vanes in the devices 18 flows via the line 106, valve 104 and unlocking line into the pump 60. When it is required to unlock the sleeve, the motor 60 is operated in the unlocking direction, and the liquid flows in the reverse circuit to that described for locking. Thus, the sleeve lock is operated independently of the arm lock.

Supposing now that the lever 58 is moved into the elevate or lower position, the solenoids 108 and 109 reverse their valves 100 and 104. At the same time, a switch is operated which causes the pump 60 to be driven in the unlocking direction. This causes liquid to flow via the unlocking line, valve 104 and line 107 to the reverse side of the device 22, and moves the vane of the latter in an unlocking direction. The liquid on the operative side of the vane flows via the line 103, valve 100 and locking line to the pump 60. When the arm is fully unlocked, a micro-switch on the device 22, similar to the switch 56 on the device 18 stops the pump 60 and starts the elevating motor. When the elevating or lowering is completed, the lever 58 is returned to the central position, and this stops the elevating motor, and starts up the pump 60 in the locking direction. Liquid then flows via the locking line valve 100 and line 103 to the device 22, which it operates in the locking direction to lock the arm to the sleeve. The liquid on the opposite side of the vane of the device 22 flows via the line 107, valve 104 and unlocking line to the pump 60. When the lock is fully applied to the arm, a time switch (not shown) stops the motor 62 and de-energizes the solenoids on the valves 100 and 104 which return to the dead position.

It will be noted that during the arm elevating or lowering cycle, the sleeve lock cannot be operated, because there is no path through the valve 100 to the device 18.

The actual arrangement of the controls for the locking devices will depend upon circumstances, for example, the particular machine to which the locking devices are applied, and also depending upon whether the locking controls are to be interconnected with or interdependent on the traversing or like controls of the machine. It will be appreciated therefore that the controls may either be simple direct controls for each group of locking devices, or they may be so arranged that traversing or the like cannot be effected when the corresponding locks are "on" and that when a traversing or like control is actuated it will first cause unlocking and then start the traversing or the like.

In the control panel illustrated in FIGURE 7, the selector switch 57 is arranged to control the solenoid operated valves interposed in the operating liquid supply lines to the several sets of locking devices, so that selected locking devices can remain unlocked when others are being locked. The panel also includes a main switch 70 for the pump motor, and two warning lights 71 and 72. Each warning light is controlled by the micro switch 56 associated with the corresponding locking device, the arrangement being that when either the slide or the sleeve is locked, the corresponding warning light 71 or 72 will be energised.

The micro switch 56 is also connected to the pump motor, and the arrangement of the cam 54 is such that when the unlocking cycle takes place to cause unlocking of the locking device, the motor will be switched off by the micro switch 56 when the vane 30 reaches the manifold block 36 at the limit of its unlocking movement. Any convenient arrangement may be provided for stopping the motor when the locking devices are locked. For example, a time switch may be arranged to stop the motor after it has been operating in the locking cycle for a predetermined time, a pressure relief valve being provided to relieve the liquid pressure after the locking device has clamped the corresponding part of the machine and before the motor has stopped. This is necessary because the position of the vane may vary in the locking position, for example on account of wear in the locking or wedging surfaces. Alternatively a pressure responsive switch may be incorporated in the liquid supply connections between the pump and the locking devices, this switch being arranged to stop the motor when the vane reaches its locking position and the pressure consequently builds up.

Instead of interconnecting the controls so as to prevent traversing or the like when the corresponding locks are "on," the traversing or like controls may be responsive to the resistance to the traversing or like movement. For example, traversing or the like may be hydraulically operated, in which case a pressure relief valve can be arranged to relieve the pressure of the operating liquid if resistance is encountered, as would be the case if the corresponding part of the machine was locked.

In the particular arrangement described, it is possible to obtain the locking effects indicated at A to H inclusive in the following table by simply setting the controls of the central panel shown in FIGURE 7 as required.

*Table of locking phases*

(A) Slide locked—sleeve locked—arm locked
(B) Slide unlocked—sleeve locked—arm locked
(C) Slide locked—sleeve unlocked—arm locked
(D) Slide unlocked—sleeve unlocked—arm locked
(E) Slide locked—sleeve locked—arm unlocked
(F) Slide unlocked—sleeve locked—arm unlocked
(G) Slide locked—sleeve unlocked—arm unlocked
(H) Slide unlocked—sleeve unlocked—arm unlocked It will be understood that the particular construction described above is by way of example as applied to a particular machine, and that the number of locking devices for each part of the machine may be varied as described, and that the locking device or devices may be provided for only one or two of the adjustable parts of the machine instead of the three parts described.

I claim:

1. Locking means for a radial arm drilling machine, said machine including a pillar, and a radial arm, a tubular sleeve surrounding the pillar, the sleeve supporting the arm, a cylinder supported by the tubular sleeve, a spindle rotatably supported by said cylinder, a vane projecting radially from said spindle within said cylinder, said vane co-operating with the cylinder wall, a pair of ports operative to selectively supply fluid under pressure directed toward the vane, one of said ports being operative to admit fluid under pressure to one side of said vane to rotate the spindle in one direction, the second port being operative to admit fluid under pressure to the opposite side of said vane to rotate the spindle in the opposite direction, hydraulic fluid control means selectively controlling the flow of fluid to either of said ports, compressible means inserted between said ports operative to seal the area between said ports relative to the spindle, the tubular sleeve having an annular sloping seat formed therein, an annular locking member fitted to the sloping seats in the pillar and the sleeve respectively, an externally threaded axial extension fixedly attached to said spindle, said annular locking member having an opening therethrough to receive the axial extension of the spindle, and nut means threadably fitted to the axial extension of the spindle operative to engage the annular locking member to force said annular locking member against the seats in the pillar and sleeve respectively, thereby to apply pressure against the seats, and lock the sleeve relative to the pillar.

2. Locking means according to claim 1, in which block means are provided within said cylinder for limiting the rotary movements of the spindle, and a sealing strip is disposed in an axially disposed groove in said block means, for engagement with the spindle.

3. Locking means according to claim 1, in which the locking member comprises a wedge disposed between oppositely facing surfaces on said two machine parts which are to be locked together.

4. Locking means according to claim 1, in which the locking member comprises a slit sleeve on one of said machine parts and said screw and nut is adapted to close the slit to clamp the sleeve on a pillar on said other of said machine parts.

5. The combination of a locking means for a radial arm drilling machine, as defined in claim 1, in which two or more locking devices are to be locked, the extension of the spindle of each of said multiple locking means passing through an opening through the annular locking member, the rotation of all of said spindles being operative to apply pressure to the annular locking member, thereby locking the sleeve relative to the pillar, the said locking devices being adapted to be actuated simultaneously, all of said fluid pressure supply means being connected in parallel, thereby automatically equalizing the load on all of the spindles, thereby equalizing the load on the locking member from all radial directions.

6. Locking means for a radial arm drilling machine, said machine including a pillar and a radial arm rotatably supported by said pillar, said locking means being operative to lock relatively moving parts of the machine, said locking means comprising a locking member mounted for rectilinear movement into and out of locking relationship with the parts of the machine, a cylinder supported by one part of the machine, a spindle rotatably supported by said cylinder, a vane projecting from said spindle within said cylinder, said vane cooperating with the cylinder wall, a plurality of ports for selectively admitting fluid under pressure to either side of said vane to cause rotation of said spindle, hydraulic fluid control means selectively controlling the flow of fluid to either of said ports, an annular locking member fitted to the sloping seats in the pillar and the sleeve, respectively, an externally threaded axial extension fixedly attached to said spindle, said annular locking member having an opening therethrough to receive the axial extension of the spindle, and nut means threadably fitted to the axial extension of the spindle operative to engage the annular locking member to force said annular locking member against the seats on the pillar and sleeve respectively in the adjoining parts, thereby to apply pressure against the seats and lock the adjoining parts relative to one another.

7. Locking means for a radial arm drilling machine, said machine including a pillar and a radial arm, a tubular sleeve surrounding the pillar, the sleeve supporting the arm of the machine, a cylinder supported by the tubular sleeve, a spindle rotatably supported by said cylinder, a vane projecting radially from said spindle within said cylinder, said vane having a groove through one face thereof in communication with the interior of the cylinder, a pad slidably fitted to the groove in said vane, said pad being operative to engage the inner surface of the wall of the cylinder, relatively flat resilient means within the groove in said vane operative to urge said pad towards said cylinder wall, a pair of ports operative to admit fluid under pressure directed toward the vane, one of said ports being operative to admit fluid under pressure directed to one side of the vane to rotate the spindle in one direction, the second port being operative to admit fluid under pressure to the opposite side of the vane, to rotate the spindle in the opposite direction, hydraulic fluid control means selectively controlling the flow of fluid to either of said ports, an externally threaded axial extension fixedly attached to said spindle, the tubular sleeve having an annular seat formed therein, the pillar having a mating annular seat formed therein, an annular locking member fitted to the seats in the pillar and the sleeve, said annular locking member having an opening therethrough to receive the axial extension of the spindle, and nut means threadably fitted to the axial extension of the spindle, operative to engage the annular locking member to move said annular locking member into engagement with the seats in the pillar and the sleeve respectively, thereby, to apply pressure against the seats and lock the sleeve relative to the pillar.

8. Locking means for a radial arm drilling machine, said machine including a pillar, and a radial arm supported by the pillar, a tubular sleeve surrounding the pillar, the sleeve supporting the arm, a cylinder supported by the tubular sleeve, locking means including a spindle rotatably supported by said cylinder, a vane projecting radially from said spindle within said cylinder, said vane co-operating with the cylinder wall, an externally threaded axial extension fixedly attached to said spindle, a pair of ports operative to selectively admit fluid under pressure directed toward the vane, hydraulic fluid control means selectively controlling the flow of fluid to either of said ports, compressible means inserted between the ports operative to seal the area between the ports relative to the spindle, the tubular sleeve having seating means formed therein, the pillar having mating seating means formed therein, an annular locking member fitted to the seating means in the pillar and the sleeve respectively, said annular locking member having an opening therethrough to receive the axial extension of the spindle, and nut means threadably fitted to the axial extension of the spindle operative to engage the annular locking member to move said annular locking member into engagement with the seating means in the pillar and the sleeve respectively, thereby to lock the sleeve relative to the pillar, and an electrical trip incorporated in the locking means, said electrical trip being adapted to open an electric circuit including a motor adapted to cause traversing of the machine part with which the locking means is associated when the locking means is actuated in a locking direction.

9. Locking means for a radial arm drilling machine, said machine including a pillar, and a radial arm rotatably supported by the pillar, a tubular sleeve surrounding the pillar, the sleeve supporting the arm of the machine, a cylinder supported by the tubular sleeve, locking means including a spindle rotatably supported by said cylinder, a vane projecting radially from said spindle within said cylinder, said vane co-operating with the wall of the cylinder, a pair of ports operative to selectively direct fluid under pressure toward the vane, one of said ports being operative to direct fluid under pressure to one side of said vane to rotate the spindle in one direction, the second port being operative to direct fluid under pressure to the opposite side of said vane to rotate the spindle in the opposite direction, hydraulic fluid control means selectively controlling the flow of fluid to either of said ports, compressible means inserted between said ports operative to seal the area between said ports relative to the spindle, an externally threaded axial extension fixedly attached to said spindle, the tubular sleeve having a seat formed therein, the pillar having a mating seat formed therein, an annular locking member fitted to the seats in the sleeve and the pillar, said annular locking member having an opening therethrough to receive the axial extension of the spindle, and nut means threadably fitted to the axial extension of the spindle operative to engage the annular locking member to move said annular member into engagement with the seats in the sleeve and the pillar respectively, thereby to lock the sleeve relative to the pillar, an electrical trip incorporated in the locking means, said electrical trip being adapted to open an electric circuit including a motor adapted to cause traversing of the machine part with which the locking means is associated when the locking means is actuated in a locking direction, the electrical trip comprising a micro-switch adapted to be actuated by a cam follower engageable with a cam which is moved by the hydraulically operable locking means.

References Cited by the Examiner
UNITED STATES PATENTS

| | | | |
|---|---|---|---|
| 2,350,066 | 5/44 | Parker. | |
| 2,420,649 | 5/47 | Breedlove. | |
| 2,540,586 | 2/51 | Lauterbur et al. | 29—1.5 |
| 2,615,372 | 10/52 | Coffin | 29—1.5 |
| 2,703,149 | 3/55 | Welson | 121—97 |
| 2,804,176 | 8/57 | Trevaskis | 188—73 |
| 2,836,086 | 5/58 | Hoelscher | 77—28 |
| 2,902,009 | 9/59 | Ludwig et al. | 121—97 |
| 2,965,968 | 12/60 | Knauer | 188—40 |
| 2,988,057 | 6/61 | Litz | 121—97 |

ARTHUR L. LA POINT, *Primary Examiner.*
FRANK E. BAILEY, T. GRAHAM CRAVER,
*Examiners.*